United States Patent
Miller

(10) Patent No.: US 8,085,216 B2
(45) Date of Patent: *Dec. 27, 2011

(54) REAL TIME DESKTOP IMAGE WARPING SYSTEM

(75) Inventor: Stephen Miller, Ridgecrest, CA (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 1047 days.

This patent is subject to a terminal disclaimer.

(21) Appl. No.: 11/873,559

(22) Filed: Oct. 17, 2007

(65) Prior Publication Data

US 2009/0102862 A1   Apr. 23, 2009

(51) Int. Cl.
*G09G 5/00* (2006.01)
(52) U.S. Cl. .......................... 345/1.1; 715/965; 715/700
(58) Field of Classification Search .................. None
See application file for complete search history.

(56) References Cited

U.S. PATENT DOCUMENTS

| | | | | |
|---|---|---|---|---|
| 5,661,531 A * | 8/1997 | Greene et al. | ............... | 349/73 |
| 6,927,908 B2 * | 8/2005 | Stark | ............... | 359/449 |
| 7,145,611 B2 * | 12/2006 | Dubin et al. | ............... | 349/5 |
| 2002/0154259 A1 * | 10/2002 | Freidhoff et al. | ............... | 349/73 |
| 2004/0051944 A1 * | 3/2004 | Stark | ............... | 359/448 |
| 2006/0077544 A1 * | 4/2006 | Stark | ............... | 359/448 |
| 2007/0291233 A1 * | 12/2007 | Culbertson et al. | ............... | 353/34 |
| 2009/0106689 A1 * | 4/2009 | Miller | ............... | 715/788 |

* cited by examiner

*Primary Examiner* — Andrew Wang
*Assistant Examiner* — David H Chu
(74) *Attorney, Agent, or Firm* — Christopher L. Blackburn; Robert R. Lerma

(57) ABSTRACT

The present invention relates to an image warping software algorithm for a real time alteration of a display scene running under the Microsoft Windows Operating System. The image warping software algorithm alters the display scene and allows an observer to view the display scene as a single unbroken image when the display scene is distributed across multiple display screens. The purpose of the image warping software algorithm is to significantly reduce the distortion observed at the abutting edges of the joined display screens.

13 Claims, 10 Drawing Sheets

REAL TIME DESKTOP IMAGE WARPING SYSTEM

STATEMENT REGARDING FEDERALLY SPONSORED RESEARCH OR DEVELOPMENT

The invention described herein may be manufactured and used by or for the government of the United States of America for governmental purposes without the payment of any royalties thereon or therefore.

STATEMENT TO INCORPORATE COMPUTER PROGRAM LISTINGS

This application incorporates herein, by reference, the following twelve computer program listings as part of the originally filed specification:

| | |
|---|---|
| 1. AboutCS.txt | 1KB in size. File creation date is 8/24/2006. |
| 2. About.DesignerCS.txt | 5 KB in size. File creation date is 8/24/2006. |
| 3. ConfigCS.txt | 24 KB in size. File creation date is 8/31/2006. |
| 4. ConfigDesignerCS.txt | 24 KB in size. File creation date is 8/24/2006. |
| 5. DetailsCS.txt | 5 KB in size. File creation date is 8/24/2006. |
| 6. DetailsDesignerCS.txt | 15 KB in size. File creation date is 8/24/2006. |
| 7. PlatFormInvokeGDI32CS.txt | 2 KB in size. File creation date is 5/24/2006. |
| 8. PlatFormInvokeUSER32CS.txt | 2 KB in size. File creation date is 5/24/2006. |
| 9. ProgramCS.txt | 1 KB in size. File creation date is 8/24/2006. |
| 10. WarpCS.txt | 17 KB in size. File creation date is 8/31/2006. |
| 11. WarpDesignerCS.txt | 3 KB in size. File creation date is 8/24/2006. |
| 12. Win32CS.txt | 12 KB in size. File creation date is 8/31/2006. |

BACKGROUND OF THE INVENTION

1. Field of Invention

The present invention relates to an image warping software algorithm for a real time alteration of a display scene running under the Microsoft Windows Operating System. The image warping software algorithm alters the display scene and allows an observer to view the display scene as a single unbroken image when the display scene is distributed across multiple display screens. The purpose of the image warping software algorithm is to significantly reduce the distortion observed at the abutting edges of the joined display screens.

2. Description of the Prior Art

In order to support the high demand for modern electronic devices to be portable, the display screens on the portable devices are continuing to decrease in size. Some examples of portable devices that are decreasing in size are laptop computers, hand-held devices known as a Personal Digital Assistants (PDAs), mobile telephones and devices that combine the features of PDAs and mobile telephones. Increasing the overall size of the user display screen for a given portable device, while maintaining portability, is a goal of all manufacturers. Demand for readable information displayed on portable devices has grown as the amount of data, graphics, web pages, e-mails, picture images, GPS mapping images, personal videos, slide presentations, financial information, and video games are made available for operation on hand-held applications. The information now being displayed, however, is getting harder to comfortably see with the naked eye as the portable devices are configured with smaller displays. This demand has created a need to increase the size of the portable device display area while still maintaining portability. At the opposite end of the demand for shrinking displays lies the demand for larger display formats obtained by using a number of independent display screens joined to display a single continuous image. Specifically, there is a demand to display satellite imagery and terrain information on a wall sized area using high resolution display units.

U.S. Pat. No. 6,927,908 issued on Aug. 9, 2005 to Bernard Stark, attempts to solve the problem of balancing the demand for large viewing areas using a number of conventional display units. However, the Stark invention induces distortion at the image breaks coincident with the edge of each display unit. An image break is the area where one display screen abuts an adjacent display screen.

In addition to Stark, others have derived solutions to somewhat eliminate both the image break and the distortion at the image break. One of these solutions is, to take two display elements and overlay refraction plates. This approach increases the size and weight of the display device and is therefore undesirable for use with portable devices and is undesirable for large wall mounted configurations.

Another solution is, to employ a light guide for each pixel in the display to guide the ray of light from the display onto a viewing surface to obfuscate the image gap. This solution is expensive and therefore undesirable to consumers and manufacturers.

And yet a third solution is to modify the edges of the display screens themselves by bending the display screens at the edge to reduce the edge width to allow two neighboring display screens to be closer together. This solution reduces the size of the image gap between screens but does not avoid it all together and is also difficult to manufacture.

And yet a fourth solution, attempts to solve the distortion problem using video hardware components to perform the image transformation.

Stark's invention is described as a system of individual display units with each display unit having a lens covering to provide optical properties at the edge of the viewing area to reduce the image gap. The purpose of the lens covering is to create the appearance of a seamless image to the observer as the multiple screens are viewed with the single distributed image. By taking advantage of the refraction of the lens covering to fill in any visible image gaps between display unit screens the single distributed image is meant to appear seamless. Although Stark's display system attempts to create a seamless image across the joined display units, there are undesired optical distortions in the image at the image breaks.

BAE Systems has attempted to eliminate the distortion present in Stark's display system by developing an offline image seaming software program. BAE Systems' solution is to capture an image and perform a best fit transformation based on the content of the image. Once the best fit transformation was performed, the image was saved as an intentionally distorted image. A user would then take the intentionally distorted image and display it onto the multi-display screen system, manually aligning the image's intentionally distorted areas to the seams of the display screens. This transformation and alignment counteracts any distortion due to the presence of the lens thus eliminating the distortion. Each time a change or modification is performed on the intentionally distorted image, the intentionally distorted image then underwent a subsequent best fit transformation, followed by a newly transformed image being saved, then displayed, followed by an alignment task. Also, each time a user wanted to display an entirely different image the user must perform the best fit transformation process then properly align the intentionally distorted image to the seams of the multi-display unit system. Another drawback of the BAE solution is that once the intentionally distorted image was created it was only compatible with the multi-display unit configuration for which it was aligned. The intentionally distorted image could not be routed to a display configuration that was not identical to the configuration for which the best fit transformation and alignment were performed. The BAE solution is not performed in real time, is processing intensive, cannot process a video stream and is only useful for a fixed set of display units.

Accordingly, there is a need for a real-time software solution to significantly reduce the distortion present when using the Stark lens system. There is a need for a software solution that includes: allowing the user to input control settings for a multi-display system, using the settings to control software execution, formatting an image in real time according to user control settings and is capable of handling a video stream and can operationally display the image in real-time using Stark's cover lens invention while significantly reducing the distortion inherent in Stark's cover lens invention.

SUMMARY OF THE INVENTION

Generally, the Real Time Desktop Image Warping system is a real-time image warping software algorithm for altering a display scene to overcome the problem of image distortion encountered at the image breaks of multiple display screens when using Stark's lens cover invention. Specifically, the present invention relates to a real-time image warping software algorithm (RTIW software) that invokes numerous Microsoft Windows Operating System (OS) features and numerous Graphics Development Interface (GDI) calls to significantly reduce the distortion induced by the Stark's lens cover. The display units that together define the overall viewing area for the distributed image are detected by the OS and are used to determine the image break locations, hereafter referred to as a seam. A seam is an area at the edges of two abutting display units that is subject to the Stark lens cover distortion. The RTIW software intentionally distorts, the seam area image by slicing, compressing, duplicating and then reconstituting the seam area image as a warped window according to a series of user defined parameters. The warped window significantly reduces the distortion induced as a result of using Stark's cover lens and provides to the viewer a relatively seamless image generated real time distributed across multiple displays units.

Functionally, there are two parts to the RTIW software. There is a main execution thread. The main execution thread controls the overall operation of the software by determining the quantity and seam thread parameters for each seam thread and by setting the start and stop parameters. Next, there is a block of seam thread processing. The block of seam thread processing consists of a seam processing call for each seam thread. The result of each seam thread processing call is to draw a warped window in order to reduce the distortion induced by the Stark lens system at the seam.

The main execution thread stops or starts any particular seam thread processing and overlays the warped window on the host's computer display. When all seam threads have been set to the satisfaction of the user all of the warped windows are displayed in real time across the multiple display units such that the viewer cannot detect the operation of the RTIW software.

The novelty of the RTIW software is in the use of the Microsft Windows OS's rendering capabilities to perform image processing as the user interacts with the host computer. Having the RTIW software invoke Microsoft Windows OS's rendering capability allows the Real Time Desktop Image Warping system to create a relatively distortion free image scene that can be distributed across any number of display units and can adapt to display units that vary in size and type.

DETAILED DESCRIPTION OF A PREFERRED EMBODIMENT

It is to be understood that the foregoing general description and the following detailed description are exemplary and explanatory only and are not to be viewed as being restrictive of the present invention, as claimed. Further advantages of this invention will be apparent after a review of the following detailed description of the disclosed embodiments which are illustrated in the accompanying drawings and described in the appended claims.

Figure 1:
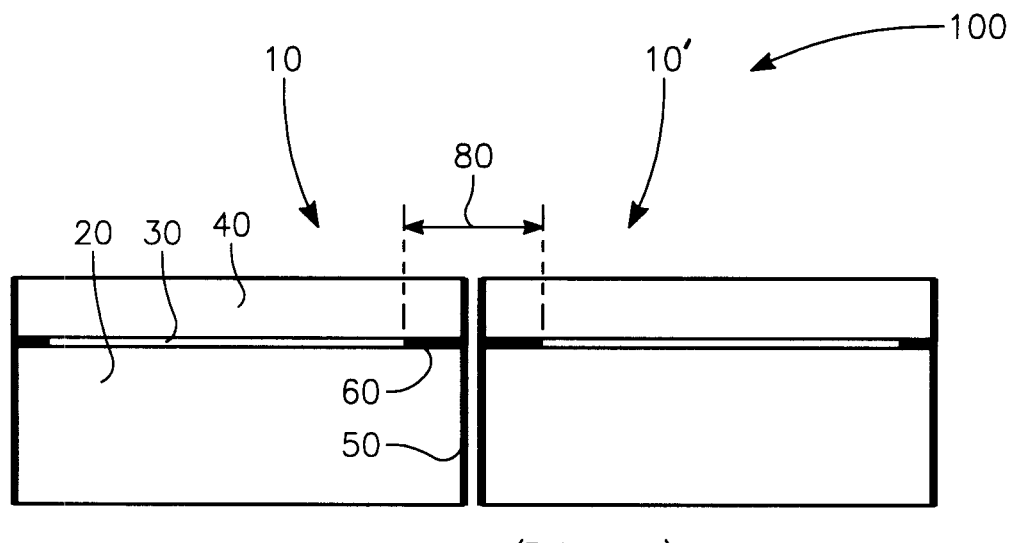
FIG. 1 illustrates a sectional view through the edge of a two-display screen system depicting an image break between the two displays.

FIG. 1 depicts a sectional view through the edge of two identical and adjacent display screens 100. In the preferred embodiment the display screens 10 and 10' are a Liquid Crystal Display (LCD) type. Applicant's invention is not limited to any particular type of display screen. The display screen 10 has a substrate 20, which can additionally include a glass plate, a polarizing element or a back light element. As depicted, the substrate 20 does not include a glass plate, a polarizing element or a back light element. Layered upon the substrate 20 is a layer of display elements 30 that serve as a matrix of pixels to generate the image scene. The display elements 30 contain a plurality of electrodes (not shown) for controlling the activity of each display element. In the preferred embodiment, the display elements are liquid crystals. The applicant's invention is not limited to liquid crystal display elements since a variety of display technologies are available. A glass cover 40 is mounted above the display elements 30 such that it is the outermost layer of the display screen 10.

The display screen 10 is bounded by a side wall 50, which provides both mechanical protection for the display screen 10 and containment of the display elements 30. Due to the thickness of the side wall 50, there is an optically inactive area 60 adjacent to the side wall 50 that is not capable of displaying any portion of the image. This optically inactive area 60 is between 1 mm to 1.5 mm wide for a typical LCD display screen.

When placing two LCD display screens (10 and 10') adjacent to one another an image break 80 exists between the two display screens (10 and 10'). The image break 80 is defined by the optically inactive area 60 of both display screens (10 and 10') and the width of the side wall 50 of both display screens (10 and 10'). Relative to an observer, significant reduction or complete elimination of this image break 80, which distorts the distributed image, is the object of the applicant's invention.

Figure 2:
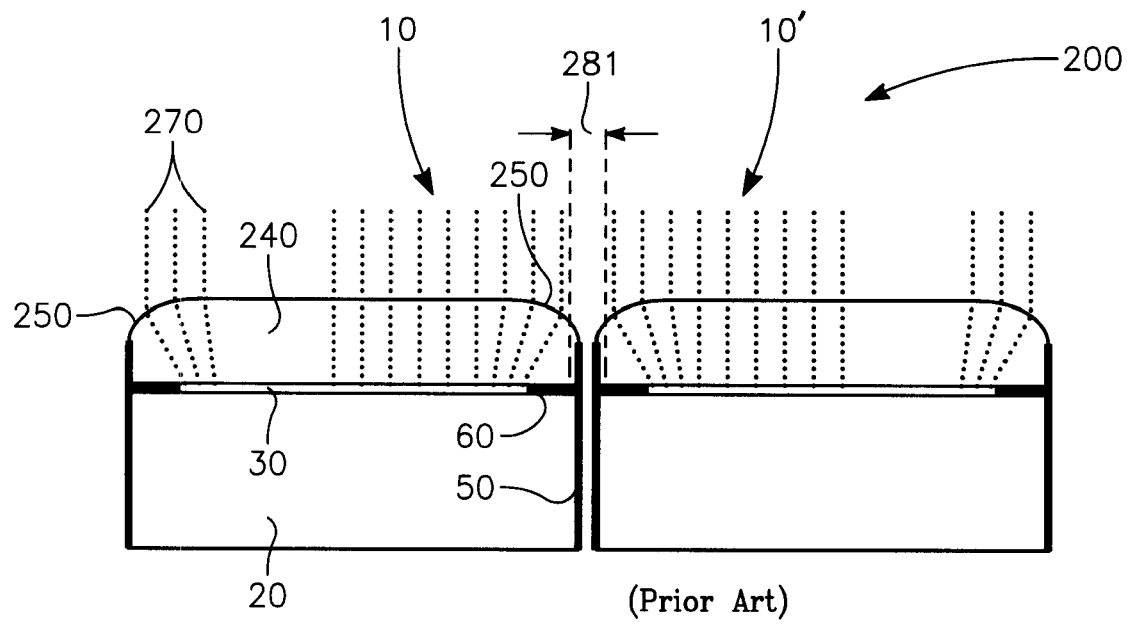
FIG. 2 illustrates a sectional view through the edge of a two-display screen system with an image break between the two displays. Each display is shown as having a display area and a rounded lens cover covering the display area.

Referring to FIG. 2, a sectional view through the edge of two display screens 200 are shown as modified by the patent to Stark. The modification is accomplished by replacing the lens cover 40 of FIG. 1 with a Stark lens cover 240 having curved edges 250. The radius of the curved edges 250 are as described in the patent to Stark. The curvature 250 of the lens cover 240 refracts light rays 270 passing through the lens cover 240 having the effect of reducing the width of the image break 281 from its original width (FIG. 1 item 80).

Figure 3:
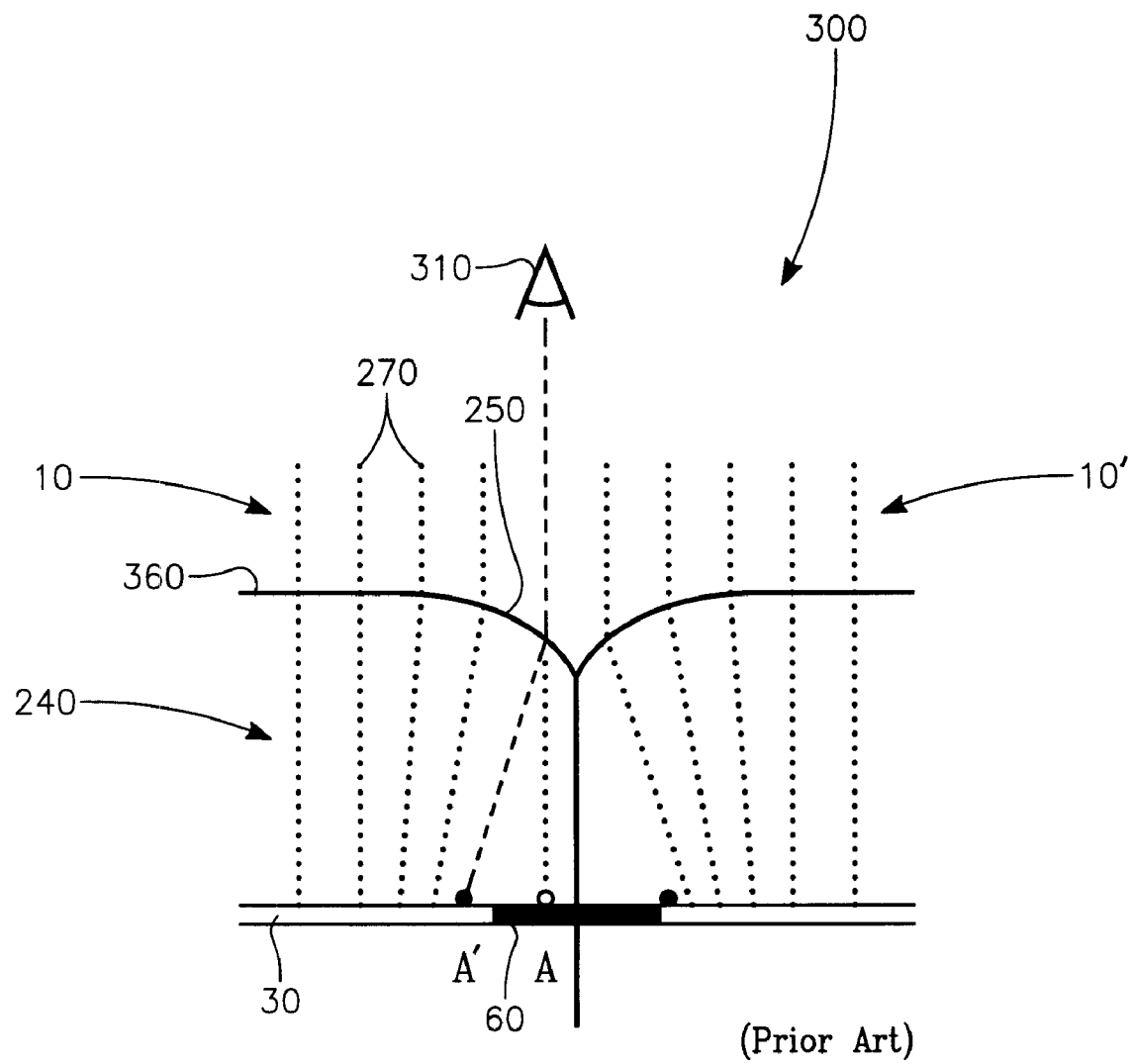
FIG. 3 illustrates a two-display screen system showing refraction of the light rays as the light rays pass through the Stark lens cover. The refracted light rays pass through the Stark lens cover straight or bent according to their origination point.

FIG. 3 depicts a view 300 from the perspective of the observer 310 as the observer views the display from a vantage point that is perpendicular to the planar portion 360 of the Stark lens cover 240. There is shown a virtual point A located at the optically inactive region 60. Point A is geometrically in line with the observers 310 vantage point but the information from a pixel located at point A' is what the observer perceives. The information from the pixel located at A' is refracted by the lens' curvature 250. The person observing the display screens (10 and 10') perceives that the optically inactive region 60 is optically active, producing the effect of narrowing the image break 80 to the width of the Stark image break 281. The distortion induced by Stark's lens cover system is evident when the light rays 270 are examined. The base of light rays 270 originate at the pixel layer 30 and pass through the curved portion 250 of Stark's lens cover. As the light rays 270 pass through the curved portion 250 of Stark's lens cover a magnification takes place and distorts the image. The magnification is denoted by the spreading of the light rays 270, relative to the spacing at the point of origin 30 and the spacing at the surface of the Stark lens cover 250.

Figure 4:
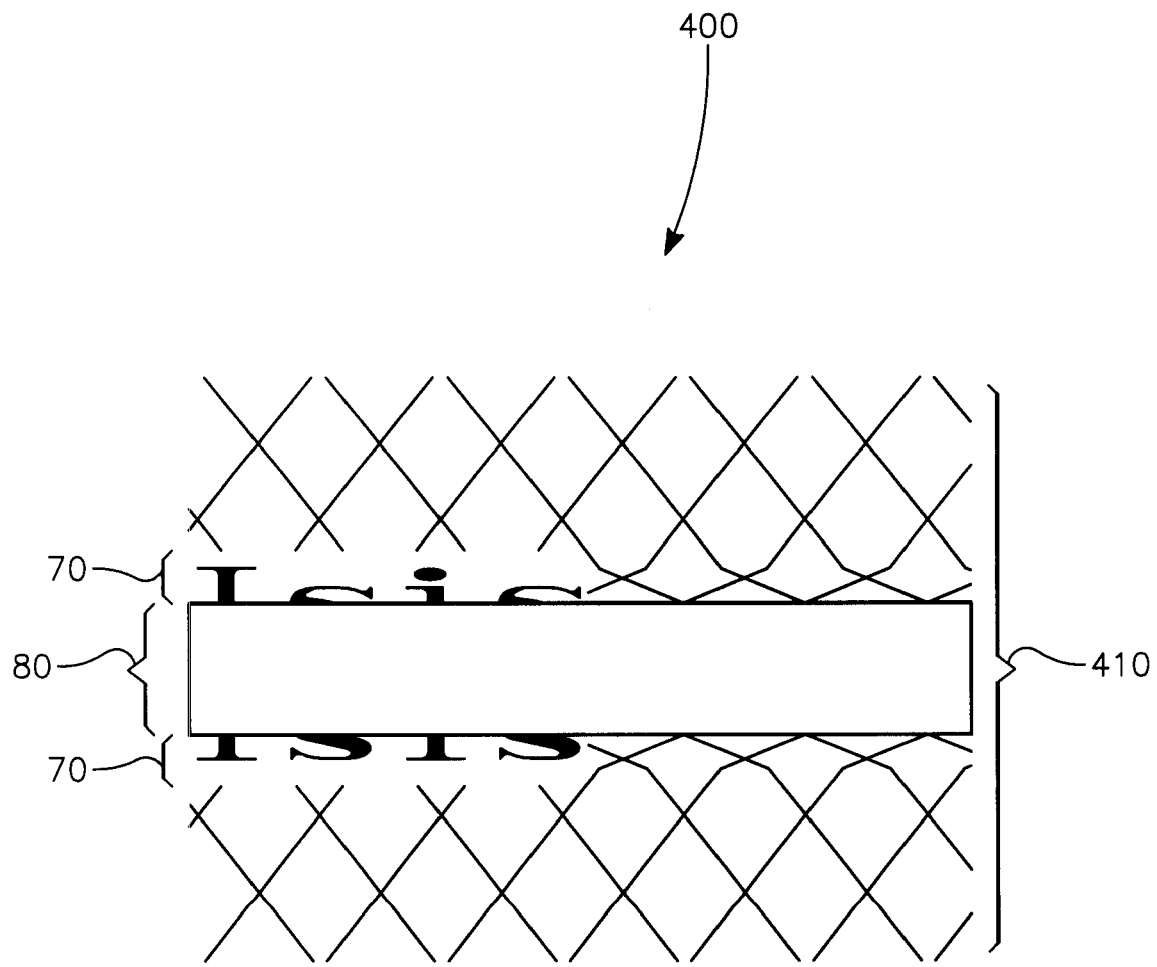
FIG. 4 shows the word "Isis" as it is viewed on a two-display screen system without the Stark lens and without the RTIW software executing. The image gap between the two display screens is evident by the presence of the broken and split word as the word spans the two display screens.

Referring to FIG. 4, item 400 shows the word "Isis" as it is viewed on a two-display screen system without the Stark lens and without the RTIW software executing. Specifically depicted is a single image scene 410 is spread across two display screens (FIGS. 1, 10 and 10') without the Stark lens cover and without the applicant's RTIW software operating. The image break 80 distorts the image of the word "Isis" 70 as viewed by the observer.

Figure 5:
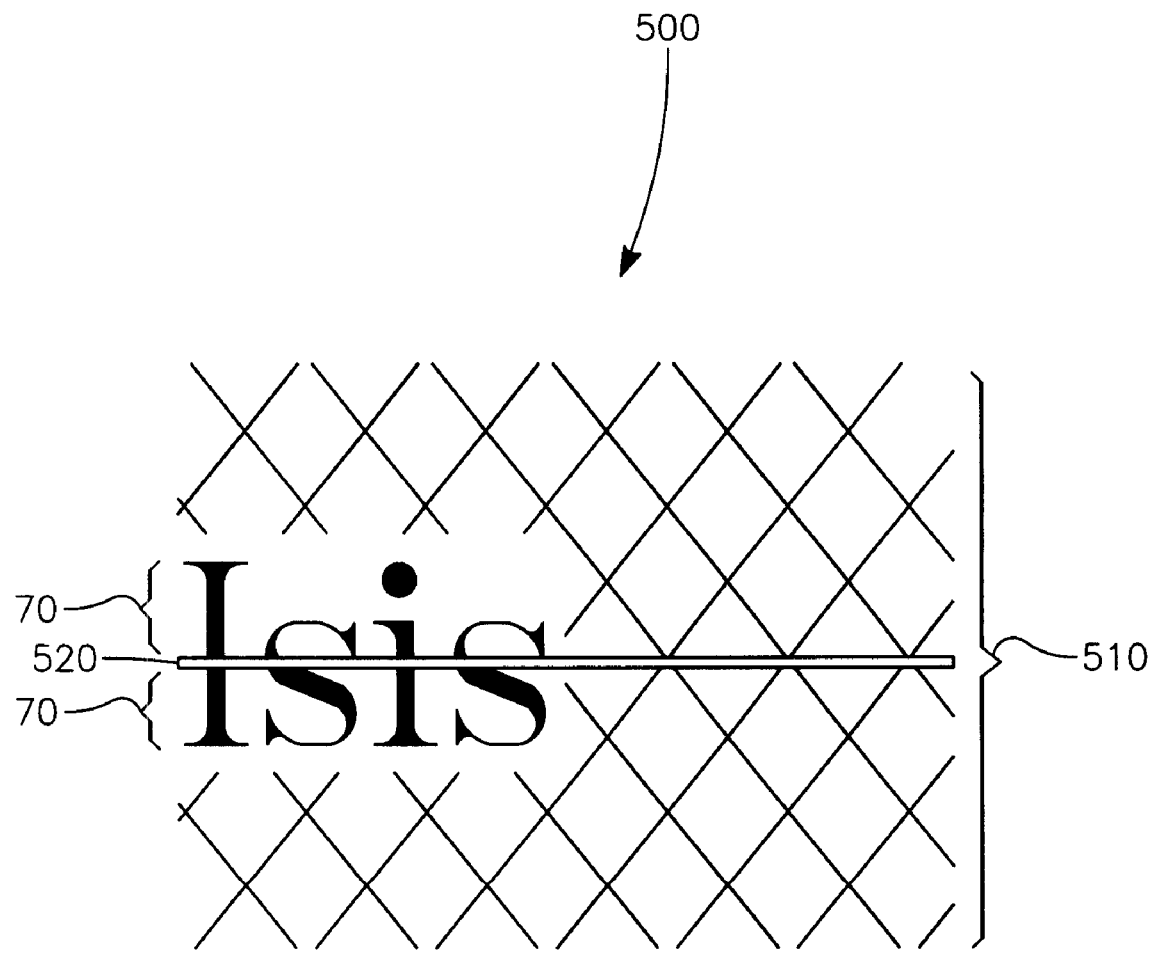
FIG. 5 shows the word "Isis" as it is viewed on a two-display screen system through the Stark cover lens while the RTIW software algorithm is executing.

Referring to FIG. 5, item 500 shows the word "Isis" as it is viewed on a two-display screen system through the stark cover lens while the RTIW software algorithm is executing. Specifically depicted is a single image scene when the Stark lens cover (FIG. 2 item 240) is used in conjunction with the RTIW software, the resulting visual effect to the observer is a single image scene (FIG. 5 item 510). The word "Isis" 70 that appears to have almost no image break 520 and therefore results in a significant reduction in the amount of distortion.

Figure 11:
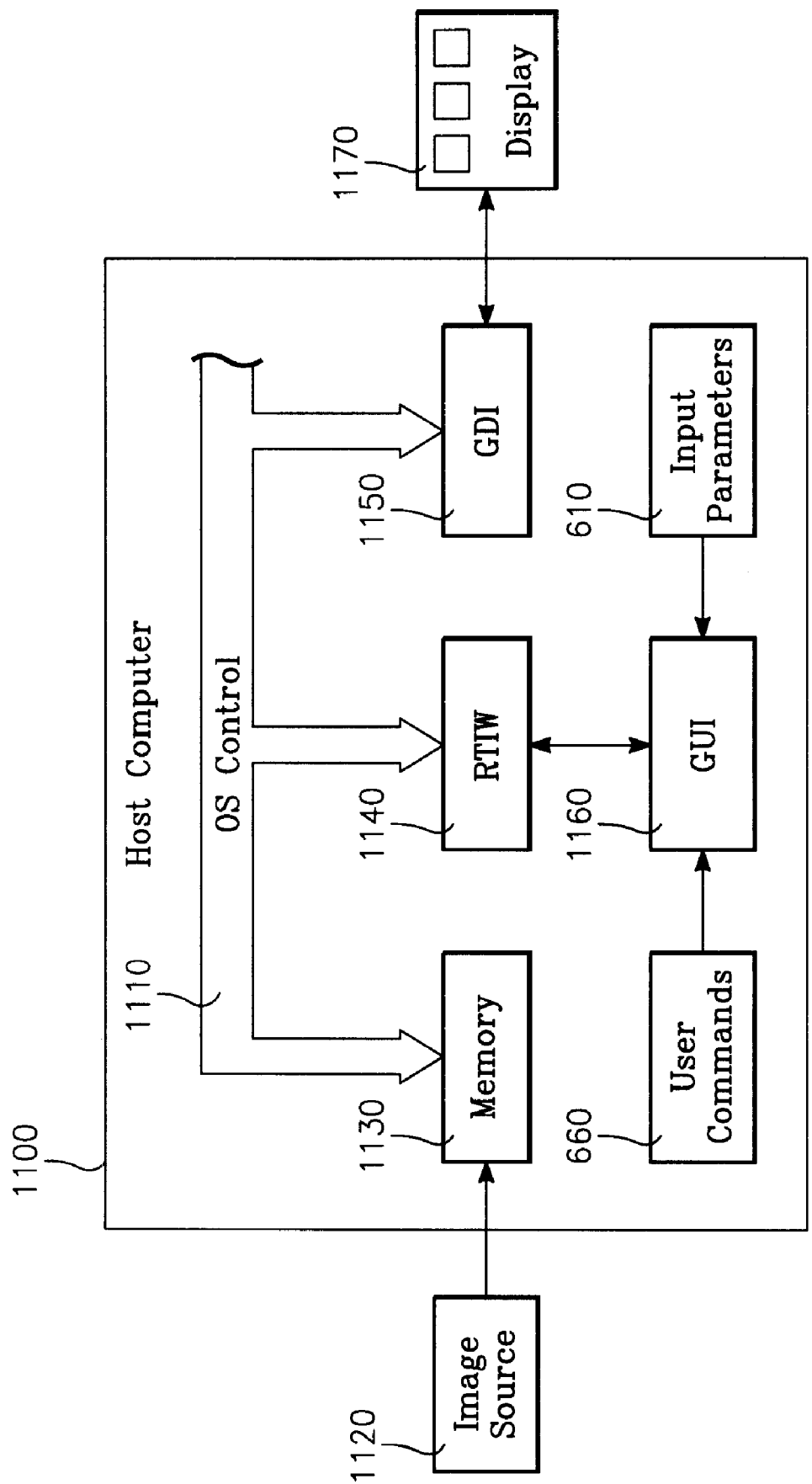
FIG. 11 is a system level diagram depicting the host computer, the input image source and the display hardware that is used to configure and display the warped window.

Referring to FIG. 11, prior to starting the RTIW software application 1140 the user must provide an image source 1120 to the host computer 1100. The image source 1120 is either a video signal, or a static image scene, or some other type of image format. The Microsoft Windows OS 1110 processes the image source 1120 information and displays the image source 1120 on the host computer's monitor 1170 in a static format. This statically formatted image is the basis from which the warped window for each seam will be created. The user will view the statically formatted image and determine the seam area, which is coincident with an image break. Each image break requires a seam to be identified from which a warped window may be created and then overlayed. The overlaying of the warped window onto the image break area is what reduces the distortion induced by the Stark lens system.

Figure 6:
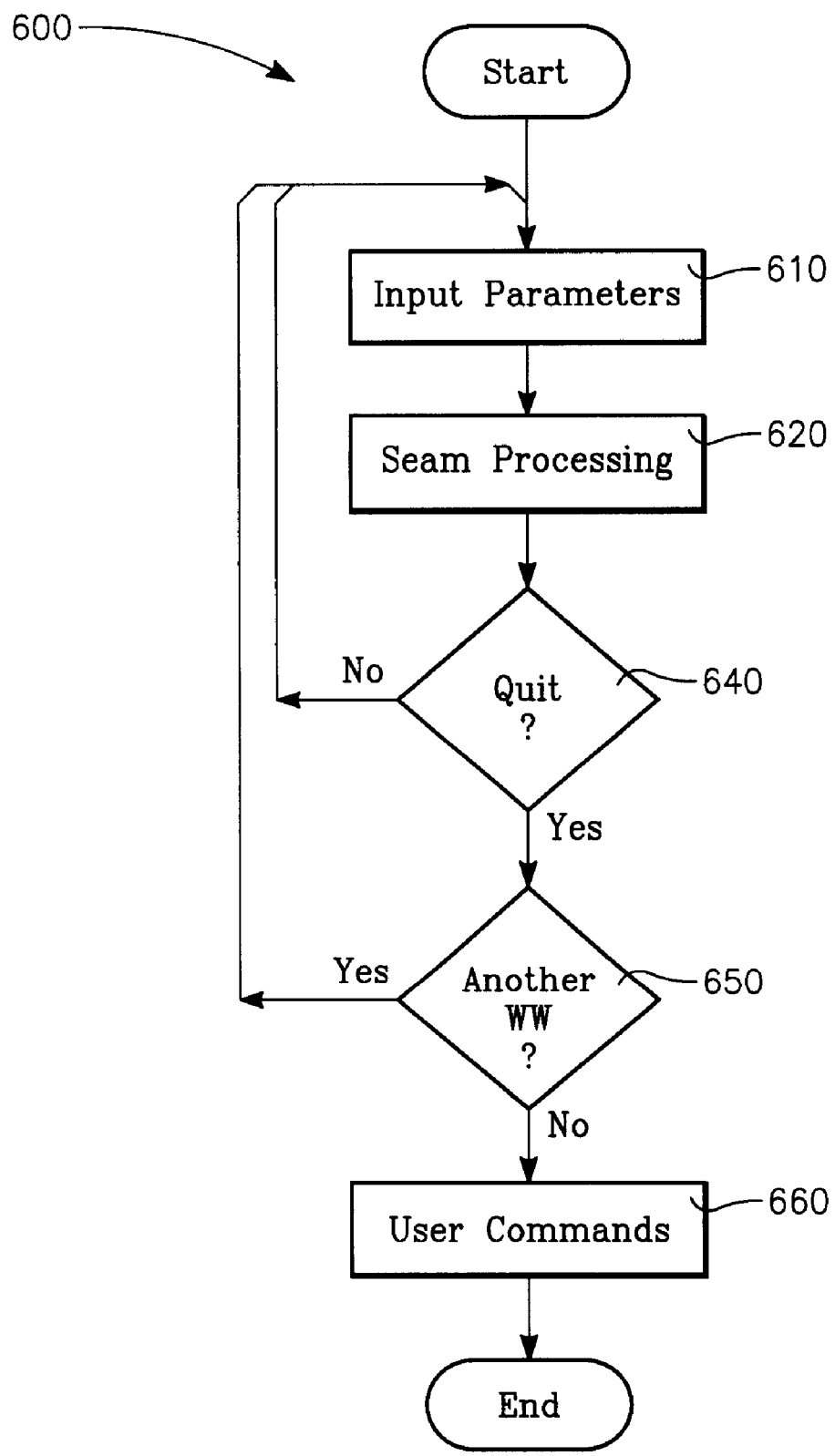
FIG. 6 is a flow chart for the main thread of RTIW software algorithm.

FIG. 6 is a high-level flowchart of the main execution thread 600 of the RTIW software algorithm. The user will launch the RTIW software application (FIG. 11 item, 1140) and start the main execution thread 600 of the RTIW software application (FIG. 11 item, 1140) by double clicking a Warp-Drive shortcut or icon (not shown) on a window that is part of the host computer interface, typically located on either the task bar or desktop.

The RTIW software application (FIG. 11 item, 1140) takes advantage of the library of programming commands inherent in Microsoft Windows, beginning with version XP, that allow customized interface windows to be built. The customized interface windows use common controls such as maximize, minimize, close, pull down menus and buttons that can be defined to control program actions and are collectively referred to as a Graphical User Interface (GUI) (FIG. 11 item, 1160). The RTIW software application (FIG. 11 item, 1140) also relies on the ability of Microsoft Windows to report on and to configure the display environment.

Figure 9:
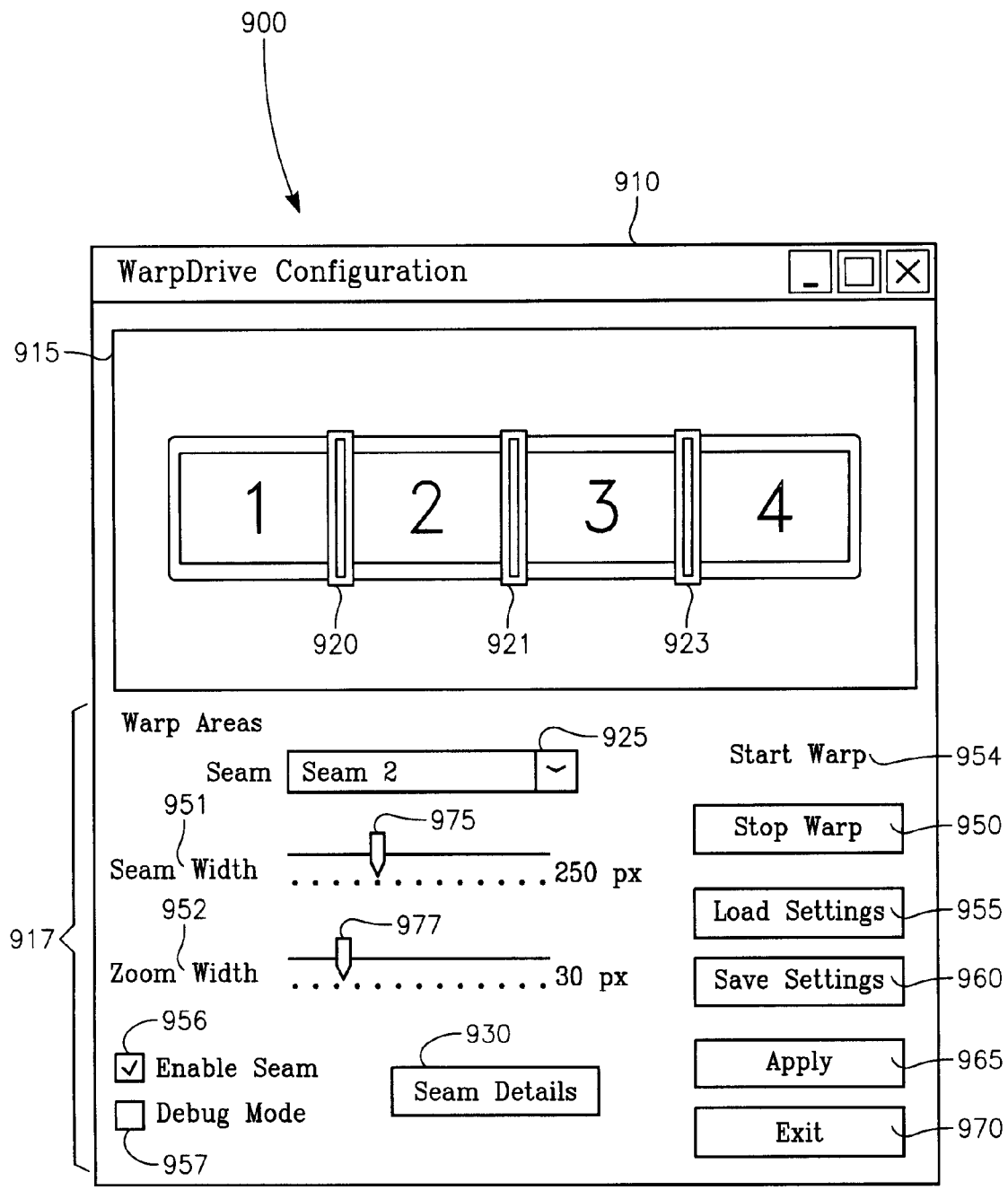
FIG. 9 is a representation of a user interface screen that will allow the user to set parameters that will be used as input to the software.

FIG. 9 is representative of a primary interface window 910 appearing as a result of launching the RTIW software and is used to determine the display unit configuration and for setting the input parameters required by the main execution thread (FIG. 6 item 610). The primary interface window 910 is built with Windows attributes for minimizing, maximizing, closing, pull down menus, mouse control, keyboard control, navigation control and dialog boxes. The primary interface window 910 is much smaller than the statically formatted image and is displayed on top of the statically formatted image. The primary interface window 910 is made up of two distinct areas. The first area 915 presents the display unit configuration and a second area 917 accepts the input parameters used by the main execution thread.

The first area 915 represents the configuration of the multiple display units and is used to identify both the seam locations and the seam quantity. The display unit configuration is obtained from the Windows OS utility that queries the host computers monitor interface and interacts with the Microsoft Windows OS utility that is available via the Microsoft Windows control panel option for viewing and controlling monitor properties. There are a total of three vertical seams (920, 921 and 923) shown in the first area 915.

The RTIW software application now requires that the user accurately set the input parameters used by the main execution thread 600. In the preferred embodiment, a variety of information and controls are presented to the user in the input parameter 917 portion of primary interface window 910. The number of seams listed in the pull down menu 925 corresponds to the number of seams in the display unit layout 915 as determined by the Microsoft Windows control panel utility for viewing and controlling monitor properties. Here three vertical seams (920, 921 and 923) are selectable. The user is provided the option to select a particular seam by using the pull down menu 925, here seam two is selected.

Figure 10:
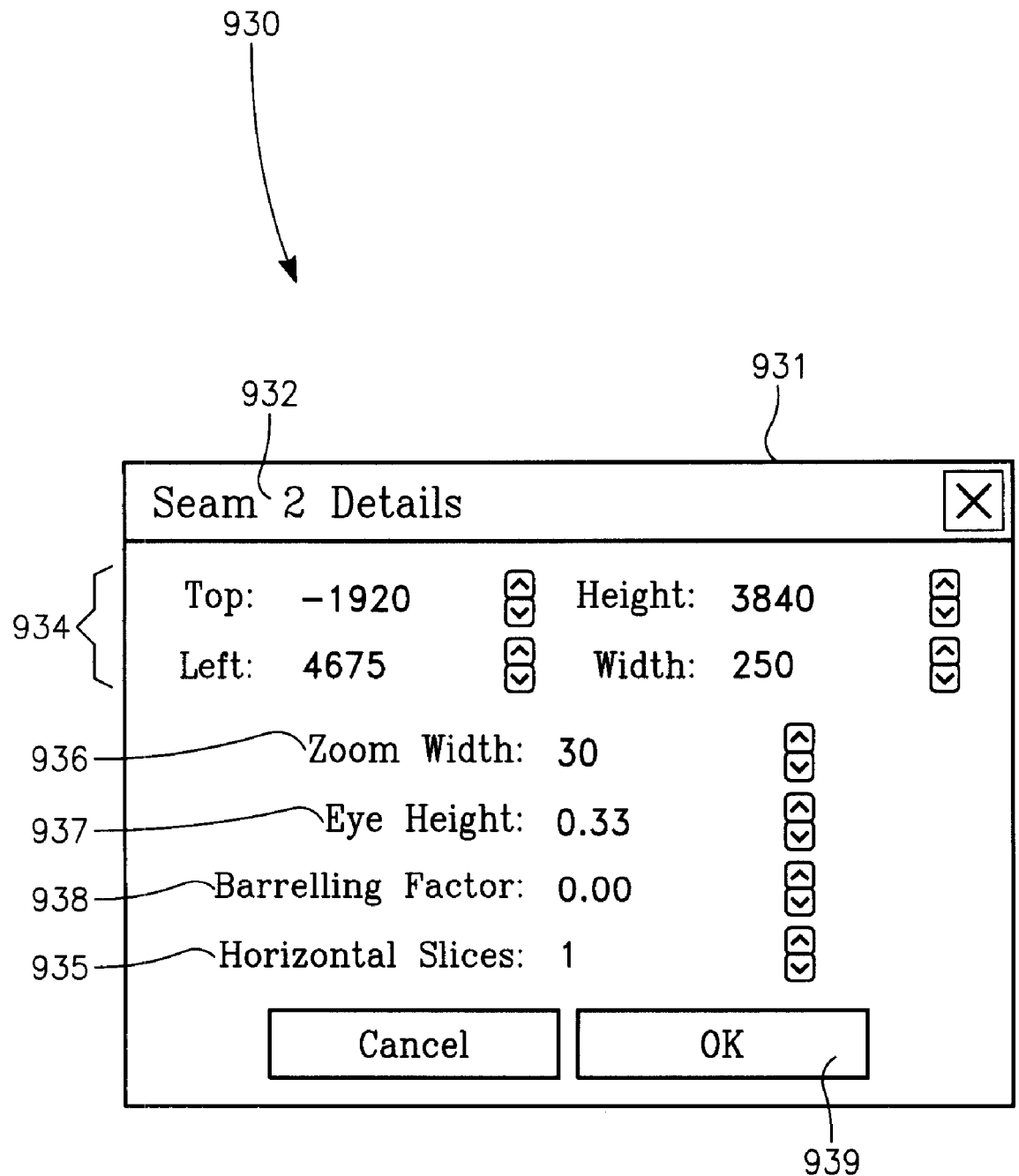
FIG. 10 is a representation of the Seam Details screen that is presented to the user when a specific seam thread is entered in the seam pull down menu and the user selects the Seam Detail button shown in FIG. 9.

The user would then select the Seam Detail button 930 to define the four corners of the warped window area. Selecting the Seam Detail button 930, results in a new window appearing as shown in FIG. 10. The Seam Detail window 931 is used to define the maximum size of the warped window, at the pixel level, for the selected seam number two 932. The corners of the seam are set by defining the parameters in the area denoted by item 934, the "Top" position, the "Left" position, the "Height" and "Width" of a rectangle (not shown) which is relative to the pixel positions for the source image displayed on the host computer's display. The user then sets the maximum size of the zoom width 936 to a value appropriate for the Stark lens in place, as an example a value of thirty is selected. The zoom width is a parameter that is later used to calculate a compression coefficient if the user elects to change the compression coefficient from the recommended value of 0.75.

Two other parameters are available for adjustment which will further reduce the distortion, an eye height center 937 and a barreling factor 938. The eye height center 937 for the display and the barreling factor 938 are dynamically applied in real time for immediate viewing on the host computer display. The last parameter that is available for adjustment is the number of horizontal slices 935. The number of horizontal slices 935 is the number of subdivisions within a seam which are used in conjunction with the barreling factor to significantly reduce the distortion. Once all of the parameters are set in the Seam Detail window 931 the user selects the "OK button 939 to transition back to the primary input parameter window 910.

Referring to FIG. 9, two boxes are available and must be checked to enable and view the results of seam processing on the host computer's display. The first box 956, enables seam mode processing and must be checked to initiate seam processing. The second box 957, enters a debug mode displays detailed operation on the warping operation, allowing the user to dynamically reconfigure the seam width 951 and the zoom width 952 while observing the results of the dynamic reconfiguration in real time on the host computer's display (FIG. 11 item, 1170). Deselecting the debug mode box 957 and selecting the apply button 965 will route the seam processing results to the multiple display units instead of the seam configuration window. A control button 950 to stop warp processing is also provided to the user. To cease operation of the RTIW software an exit button 970 is provided.

The user is provided a button 960 to save the input parameter settings to a file for storage in computer memory (FIG. 11 item, 1130). The user is also provided a button 955 to load the input parameter settings from a previously stored file when a multiple display configuration is repeatedly used.

The RTIW software application (FIG. 11 item, 1140) communicates with the Microsoft Windows OS via GDI (FIG. 11 item, 1150) calls to dynamically superimpose a rectangle (not shown) over the source image to represent the seam width selections for the warped window and a rectangle (not shown) over the source image to represent the zoom width selections for the warped window once the user initiates seam processing by selecting the Start Warp button 954, provided that the user has selected the Debug check box 957.

Figure 7:
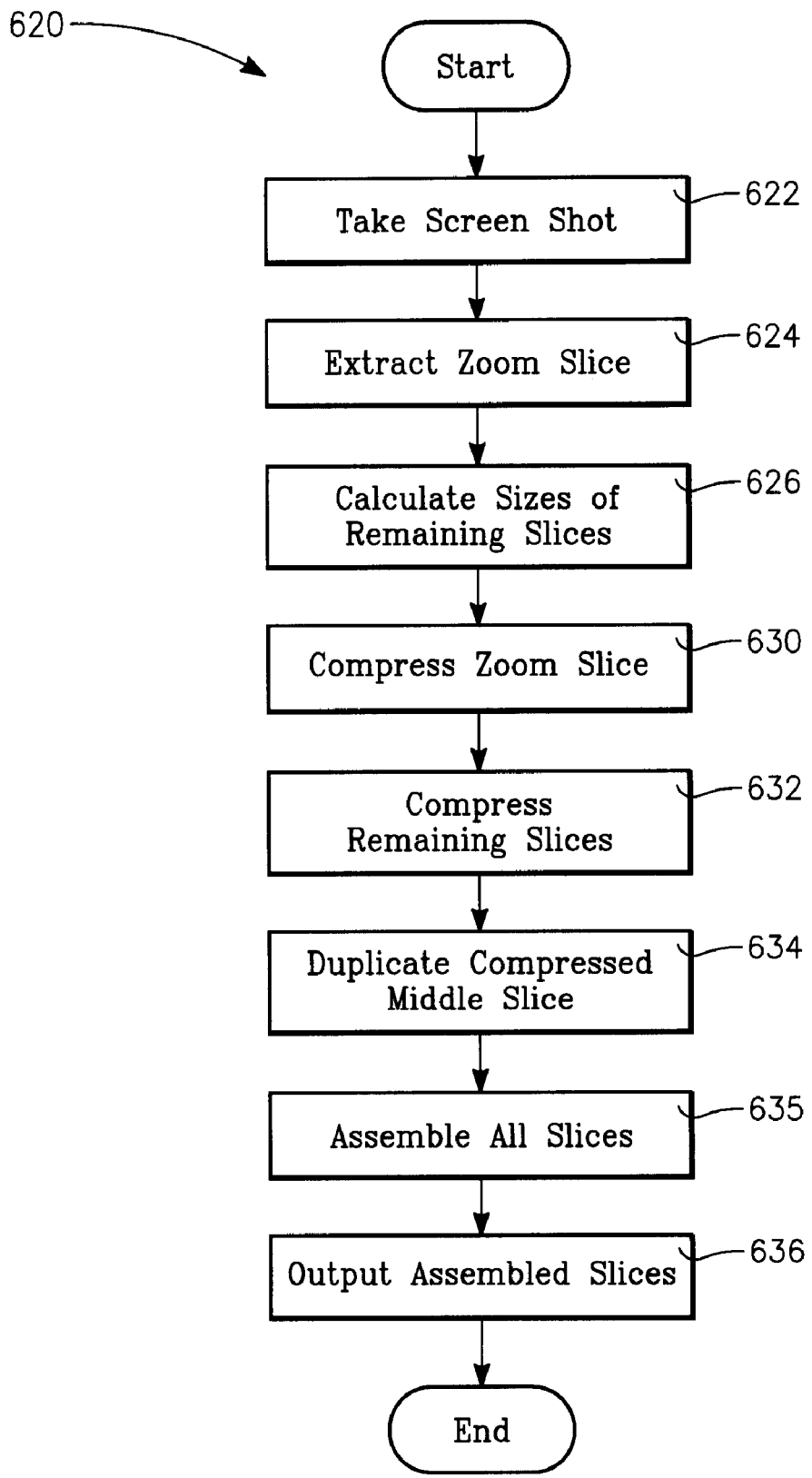
FIG. 7 is a flow chart of the seam thread processing portion of the RTIW software algorithm called by the main execution thread.

Referring to FIG. 6, the seam processing module 620 invokes seam processing per the input parameters set in the input setting module 610. Detailed operation of the seam processing module 620 is shown in FIG. 7 and begins by taking a screen shot of the source image in module step 622. A screen shot is an image capture using GDI (FIG. 11 item, 1150) calls where the image captured has a size as defined by the boundaries for the warped window set by the user via the Seam Detail window (FIG. 10 item 934) or is automatically generated by the application using the display screen configuration based upon the display screen configuration information detected by the Microsoft OS. The screen shot is then broken into three slices by first extracting a zoom slice, module step 624, then using the width of the zoom slice to determine the remaining two slices, module step 626. The zoom slice is then compressed, module step 630, to three quarters of its original width. The remaining slices are then compressed, module step 632, and the middle portion of the screen shot area is duplicated, module step 634. The result is four slices from the original three slices that are then assembled, module step 635, and fitted into the original width of the screen shot and output in module step 636 as a warped window.

Figure 8:
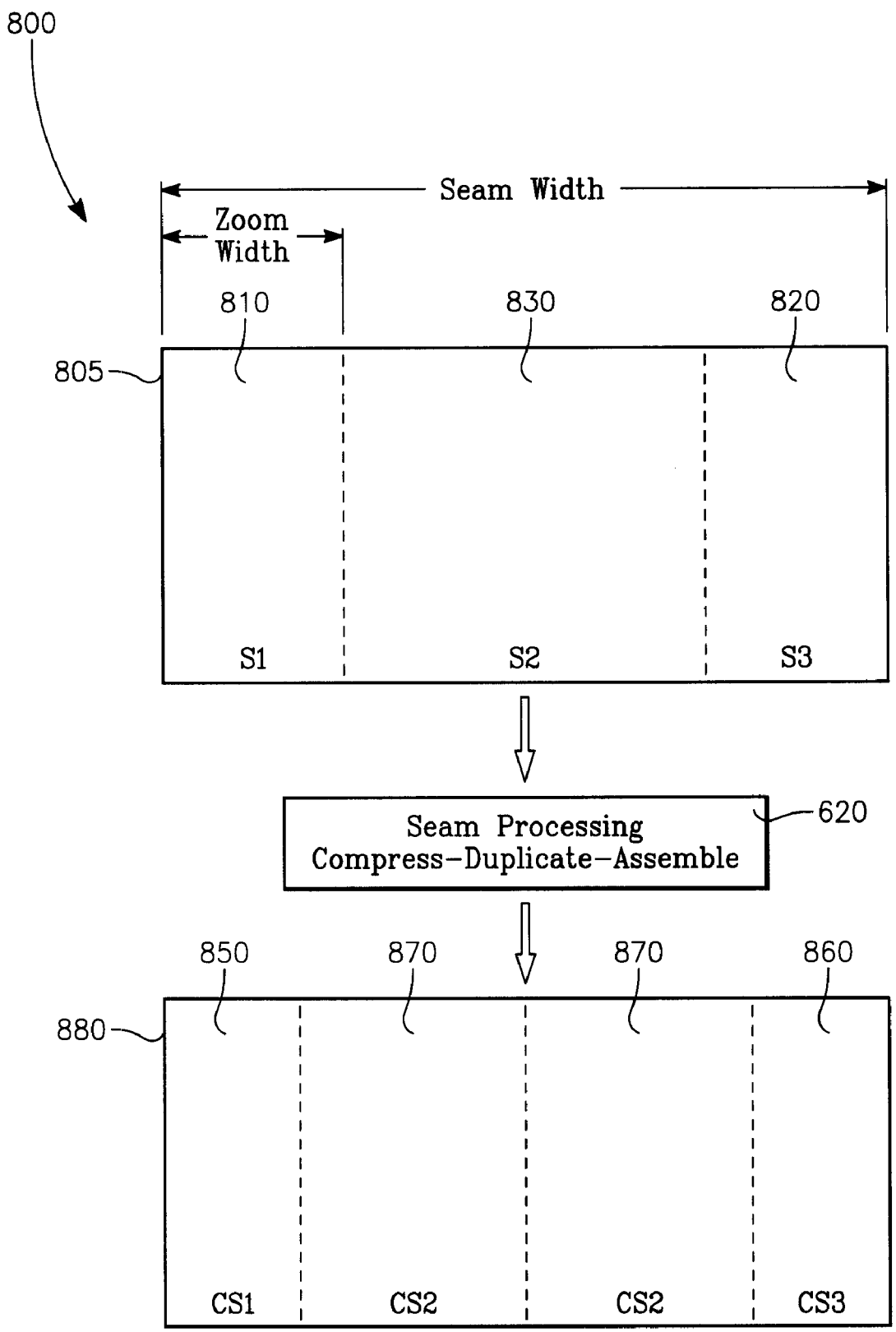
FIG. 8 graphically represents the slicing, the compression, the duplication and assembling required to produce the warped window.

The functionality of the seam processing module (FIG. 7 item 620) will now by described in detail. Referring to FIG. 8, the first slice (S1) 810 extracted from of the screen shot 805 is taken from the leftmost portion of the screen shot 805 and is as wide as the zoom width setting (FIG. 10 item 936). The next slice (S3) 820 is taken from the rightmost portion of the screen shot 805 and is also as wide as the zoom width setting (FIG. 10 item 936).

The S1 slice is then compressed (FIG. 7 item 626) to three quarters of the zoom width setting (FIG. 10 item 936) resulting in slice CS1 850, see Equation 1.

$$\text{Width of } CS1 = 0.75 * \text{Width of } S1 \quad \text{Equation 1}$$

The S3 slice is then compressed (FIG. 7 item 632) to three quarters of the zoom width setting (FIG. 10 item 936) resulting in slice CS3 860, see Equation 2.

$$\text{Width of } CS3 = 0.75 * \text{Width of } S3 \quad \text{Equation 2}$$

The S2 830 slice must be compressed to a slice (CS2) 870 having a width such that when CS2 870 is duplicated (FIG. 7 item 634) both of the CS2 870 slices will fit into the area left vacant by CS1 850 and CS3 860.

The width of the last slice CS2 870 is determined per Equation 3.

$$\text{Width of } CS2 = (\text{Seam Width} - (\text{Width of } CS1 + \text{Width of } CS3))/2 \quad \text{Equation 3}$$

All four slices, slice CS1 850, both CS2 slices 870 and slice CS3 860 are assembled to produce a warped window 880.

The user can now perform a fine adjustment to the width of seam two 921 by dragging the slider 975 between the minimum value, the far left end of the bar, to the maximum value of two hundred fifty pixels, "250 px", where the maximum value was set in the Seam Detail (FIG. 10 item 934) window. The user can then perform a fine adjustment to the zoom width 952 by dragging the slider 977 between the minimum value the far left end of the bar, to the maximum value, the far right end of the bar. Again, our example uses a maximum value of thirty pixels, "30 px", where the maximum value was entered by the user in the Seam Detail (FIG. 10 item 934) window. The impact of the fine adjustments for the seam and zoom widths are made available for observation on a real time basis by the use of GDI processing. The observer is provided immediate feedback of the fine adjustments by observing changes to the warp window preview area of the control panel (FIG. 9 item 910) as it lies on top of the statically formatted source image. The warped window is transparent to normal Microsoft Windows user activity such as mouse clicks and keyboard events.

Referring to FIG. 6, the flow chart 600 for the main thread of RTIW software application algorithm; when the user is satisfied that the warped window will cover the seam the user sends a close command, which causes the main thread to become dormant and hides the control panel (FIG. 9 item 910). As long as the user does not stop the warped window processing the main thread continuously monitors for changes to the user inputs 610. When the quit command 640 is detected the main thread checks to see if another warped window 650 requires adjustment or defining. If no other warped window is selected the main thread monitors the user commands 660 for commands to save the settings, apply the settings or to exit the RTIW software application.

What is claimed is:

1. A non-transitory computer readable medium having computer program code recorded thereon, wherein the program code includes sets of instructions comprising:
   first computer instructions for generating a real time image warping system graphical user interface residing on a host computer;
   second computer instructions for maintaining an input parameter memory within said host computer;
   third computer instructions for accepting a plurality of input parameters generated by manipulating a plurality of software programmed interfaces maintained by and displayed on said real time image warping system graphical user interface wherein said plurality of input parameters are stored in said input parameter memory;
   fourth computer instructions for communicating with a graphics development interface, where said graphics development interface is in communication with an operating system executing on said host computer;
   fifth computer instructions for performing a screen capture from an image source wherein said screen capture contains a plurality of seams wherein each seam has a seam area set by a seam width parameter stored within said input parameter memory;
   sixth computer instructions for slicing said seam area into a first slice, a second slice and a third slice according to a zoom width parameter stored within said input parameter memory;
   seventh computer instructions for compressing said first slice and said third slice according to a compression coefficient resulting in a compressed first slice CS1 and a compressed third slice CS3;
   eighth computer instructions for compressing said second slice resulting in a compressed second slice CS2 wherein said compressed second slice CS2 has a slice width according to the equation:

width of $CS2=(\text{seam width}-(\text{width of } CS1+\text{width of } CS3))/2$;

ninth computer instructions for duplicating said compressed second slice resulting in an identical pair of compressed second slices;
   tenth computer instructions for assembling a warped window consisting of said compressed first slice, said compressed third slice, said identical pair of compressed second slices where said first compressed slice and said third compressed slice maintain a position consistent with a pre-sliced position;
   eleventh computer instruction for displaying said warped window over said image source in real time on a monitor connected to said host computer according to a series of commands from said real time image warping system graphical user interface acted upon by said graphical development interface executing on said host computer; and
   twelfth computer instruction for routing said warped window to a plurality of display units to effectuate an alteration to a real time image source distributed across said plurality of display units wherein said alteration mitigates a distortion at the abutting edges of said plurality of display units induced by a lens system.

2. The non-transitory computer readable medium of claim 1 wherein said warped window displayed on said monitor is dynamically updated in real time to reflect a change to said input parameter memory.

3. The non-transitory computer readable medium of claim 1 wherein said seam has an orientation that includes a vertical seam and a horizontal seam.

4. The non-transitory computer readable medium of claim 1 wherein said compression coefficient is 0.75.

5. The non-transitory computer readable medium of claim 1 wherein said plurality of input parameters includes an eye height center, a barreling factor, a horizontal slice parameter and a pixel definition of said warp window boundaries.

6. The non-transitory computer readable medium of claim 1 wherein said image source includes a video stream, a static image, or a series of static images.

7. A non-transitory computer readable media having stored thereon a computer program that is executed by a digital computer for:
   accepting a plurality of input parameters wherein said plurality of input parameters are accepted via a multi-level graphical user interface displayed on a monitor connected to said digital computer;
   storing said plurality of input parameters in an internal parameter memory residing in said digital computer wherein said internal parameter memory is in communication a multi-level graphical user interface;
   taking a screen shot by invoking an image processing software program integral to said host computer in communication with a graphical development interface that is integral to said host computer resulting in a statically formatted image;
   extracting from said statically formatted image a seam area having a seam width determined by a seam width parameter;
   processing said seam area wherein said processing includes digitally slicing said window area into three slices having a slice width dictated by a zoom width parameter,
   compressing a leftmost slice according to a width compression factor and compressing a rightmost slice according to said width compression factor resulting in a compressed leftmost slice and a compressed rightmost slice;
   compressing a remaining middle slice and then duplicating said remaining middle slice resulting in a pair of identical compressed middle slices wherein said pair of identical compressed middle slices fits into a middle portion of said seam area not occupied by said compressed leftmost slice and said compressed rightmost slice;

assembling said compressed leftmost slice, said pair of identical compressed middle slices, said rightmost slice into said seam area producing a warped window;

refining a shape of said warped window by changing said seam width parameter and said zoom width parameter by manipulating said multi-level graphical user interface resulting in a warped window that mitigates a distortion induced by a lens system; and routing said warped window to a plurality of joined display screens wherein said joined display screens appear as a single screen due to said warped window's mitigation of said distortion induced by a lens system.

8. The non-transitory computer readable media of claim 7 wherein said compression factor is 0.75.

9. The non-transitory computer readable media of claim 7 wherein said input parameters include an eye height center, a barreling factor, a horizontal slice parameter and a pixel definition of said warp window boundaries.

10. The non-transitory computer readable media of claim 7 wherein said multi-level graphical user interface monitors in real time a plurality of user commands to control said extracting, said processing and said compressing operations.

11. The non-transitory computer readable media of claim 7 wherein said screen shot is taken from a plurality of image formats including a video stream, a static image, or a series of static images.

12. The non-transitory computer readable media of claim 7 wherein said seam width is oriented vertically.

13. The non-transitory computer readable media of claim 7 wherein said seam width is oriented horizontally.

* * * * *